(12) United States Patent
Duale et al.

(10) Patent No.: US 10,715,473 B2
(45) Date of Patent: Jul. 14, 2020

(54) OPTIMIZED MESSAGE EXCHANGE

(71) Applicant: International Business Machines Corporation, Armonk, NY (US)

(72) Inventors: Ali Y. Duale, Poughkeepsie, NY (US);
Asmahan Ali, Poughkeepsie, NY (US);
Mustafa Mah, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 16/043,337

(22) Filed: Jul. 24, 2018

(65) Prior Publication Data

US 2020/0036669 A1    Jan. 30, 2020

(51) Int. Cl.
*G06F 15/16* (2006.01)
*H04L 12/58* (2006.01)
*G06Q 10/10* (2012.01)

(52) U.S. Cl.
CPC ........... *H04L 51/22* (2013.01); *G06Q 10/107* (2013.01); *H04L 51/26* (2013.01)

(58) Field of Classification Search
CPC ......... H04L 51/22; H04L 51/24; H04L 51/26; H04L 51/34; G06Q 10/10; G06Q 10/107
USPC ................. 709/203, 204, 205, 206
See application file for complete search history.

(56) References Cited

U.S. PATENT DOCUMENTS

| | | | |
|---|---|---|---|
| 6,108,688 A * | 8/2000 | Nielsen | G06Q 10/107 709/206 |
| 6,185,603 B1 | 2/2001 | Henderson et al. | |
| 7,313,615 B2 * | 12/2007 | Fitzpatrick | H04L 29/06 709/223 |
| 7,509,382 B1 * | 3/2009 | Jania | H04L 12/1831 709/206 |
| 7,552,178 B2 * | 6/2009 | Chen | H04L 51/34 709/206 |

(Continued)

OTHER PUBLICATIONS

Anonymous; "A method for embedding action-tracking agents within an email and automated monitoring for completion of that action"; IP.com No. IPCOM000236748D; Dated May 14, 2014; 2 pages.

(Continued)

*Primary Examiner* — Thu Ha T Nguyen
(74) *Attorney, Agent, or Firm* — Cantor Colburn LLP; Teddi Maranzano

(57) ABSTRACT

Provided are systems, methods, and media for optimized processing of message responses from multiple email recipients. An example method includes receiving, by a message exchange system, an email message from a sender that is to be transmitted to a plurality of recipients. The method includes receiving, by the message exchange system, a number of commitment messages from one or more recipients of the plurality of recipients. The method includes transmitting by the message exchange system, in response to detecting that the number of received commitment messages is equal to a requested number of responses, a first alert to a subset of recipients of the plurality of recipients indicating that the subset of recipients do not need to respond to the email message, in which the subset of recipients are the recipients who did not transmit a commitment message to the message exchange system.

20 Claims, 12 Drawing Sheets

(56) References Cited

U.S. PATENT DOCUMENTS

| | | | |
|---|---|---|---|
| 7,568,151 B2* | 7/2009 | Bargeron | G06Q 10/10 715/231 |
| 7,734,709 B2* | 6/2010 | Goodman | H04L 51/04 709/207 |
| 7,769,813 B2* | 8/2010 | Tsuruta | H04L 51/28 709/204 |
| 7,895,277 B2 | 2/2011 | Drory et al. | |
| 8,347,396 B2* | 1/2013 | Grigsby | G06F 21/6263 380/268 |
| 8,539,029 B2* | 9/2013 | Manning | G06Q 10/107 709/206 |
| 8,635,285 B2* | 1/2014 | D'Amato | G06F 16/93 709/206 |
| 10,216,722 B2* | 2/2019 | Patel | G06F 40/274 |
| 2005/0228996 A1* | 10/2005 | Mayer | H04L 63/126 713/170 |
| 2005/0262208 A1* | 11/2005 | Haviv | G06Q 10/107 709/206 |
| 2006/0041505 A1* | 2/2006 | Enyart | G06Q 20/102 705/40 |
| 2006/0253537 A1* | 11/2006 | Thomas | G06Q 10/107 709/206 |
| 2007/0288577 A1* | 12/2007 | Kronlund | G06Q 10/107 709/206 |
| 2008/0086530 A1 | 4/2008 | Gandhi et al. | |
| 2008/0126489 A1* | 5/2008 | Potluri | H04L 51/00 709/206 |
| 2008/0256201 A1* | 10/2008 | Flowers | H04L 51/28 709/206 |
| 2009/0228558 A1* | 9/2009 | Brenner | G06Q 10/107 709/206 |
| 2010/0198928 A1* | 8/2010 | Almeida | G06Q 10/107 709/206 |
| 2010/0306317 A1* | 12/2010 | Serr | G06Q 10/107 709/205 |
| 2011/0252104 A1* | 10/2011 | Nachum | H04L 51/12 709/206 |
| 2011/0270937 A1* | 11/2011 | Portilla | H04L 51/34 709/206 |
| 2012/0179761 A1* | 7/2012 | Fuhrmann | H04L 51/36 709/206 |
| 2013/0179243 A1* | 7/2013 | Wescott | G06Q 30/0227 705/14.23 |
| 2013/0346525 A1* | 12/2013 | Chen | H04L 51/26 709/206 |
| 2014/0365303 A1* | 12/2014 | Vaithilingam | G06F 16/9535 705/14.54 |
| 2015/0381533 A1* | 12/2015 | Klemm | H04L 51/02 709/206 |
| 2016/0065520 A1* | 3/2016 | Puranik | G06Q 10/10 715/752 |
| 2016/0119274 A1* | 4/2016 | Ghafourifar | H04L 51/36 709/206 |
| 2016/0191437 A1* | 6/2016 | Thomas | H04W 4/12 709/206 |
| 2017/0182423 A1* | 6/2017 | Leppinen | A63F 13/352 |
| 2017/0329843 A1 | 11/2017 | Albouyeh et al. | |
| 2019/0227776 A1* | 7/2019 | Palshikar | G06F 3/0486 |
| 2020/0067958 A1* | 2/2020 | Galula | H04L 63/1425 |

OTHER PUBLICATIONS

Choi et al.; "Boundary Detection of Multiple Related Temporal Duration of Schedules in Email"; K-CAP '11 Proceedings of the Sixth International Conference on Knowledge Capture (2011); pp. 97-103.

* cited by examiner

OPTIMIZED MESSAGE EXCHANGE

BACKGROUND

The present invention generally relates to electronic communication systems, and more specifically, to message exchange systems that manage responses from multiple recipients.

Some email systems allow a sender to send an email to a group of recipients and allows multiple recipients to respond to the email. In regards to obtaining responses from recipients, often times multiple recipients respond to the email. In some scenarios, a sender may pose a question to a group of recipients via an email message and each of the recipients may respond to the email message with a similar answer and/or respond at about the same time. However, if a sender only wishes to obtain a single answer to their question, obtaining multiple responses may reduce the efficiency of the email system by expending processing and routing resources for undesired email responses.

SUMMARY

Embodiments of the present invention provide a computer-implemented method for optimized processing of message responses from multiple email recipients. A non-limiting example of the computer-implemented method includes receiving, by a message exchange system having one or more processors, an email message from a sender that is to be transmitted to a plurality of recipients. The email message includes one or more sender selected options, in which the one or more sender selected options includes a response deadline and a requested number of responses, in which the requested number of responses is less than or equal to the number of recipients in the plurality of recipients. The method includes transmitting, by the message exchange system, the email message to the plurality of recipients. The method includes receiving, by the message exchange system, a number of commitment messages from one or more recipients of the plurality of recipients, subsequent to transmitting the email message to the plurality of recipients. Each of the commitment messages is received from a different recipient of the plurality of recipients and includes an indication that the recipient intends to transmit an email response to the sender prior to the response deadline. The method includes transmitting by the method exchange system, in response to detecting that the number of received commitment messages is equal to the requested number of responses, a first alert to a subset of recipients of the plurality of recipients, indicating that the subset of recipients do not need to respond to the email message, in which the subset of recipients are the recipients who did not transmit a commitment message to the message exchange system.

Embodiments of the present invention provide a system for optimized processing of message responses from multiple email recipients, in which the system includes one or more processors configured to perform a method. A non-limiting example of the method includes receiving, by the system, an email message from a sender that is to be transmitted to a plurality of recipients. The email message includes one or more sender selected options, in which the one or more sender selected options includes a response deadline and a requested number of responses, in which the requested number of responses is less than or equal to the number of recipients in the plurality of recipients. The method includes transmitting, by the system, the email message to the plurality of recipients. The method includes receiving, by the system, a number of commitment messages from one or more recipients of the plurality of recipients, subsequent to transmitting the email message to the plurality of recipients. Each of the commitment messages is received from a different recipient of the plurality of recipients and includes an indication that the recipient intends to transmit an email response to the sender prior to the response deadline. The method includes transmitting by the system, in response to detecting that the number of received commitment messages is equal to the requested number of responses, a first alert to a subset of recipients of the plurality of recipients, indicating that the subset of recipients do not need to respond to the email message, in which the subset of recipients are the recipients who did not transmit a commitment message to the system.

Embodiments of the invention provide a computer program product for optimized processing of message responses from multiple email recipients, the computer program product comprising a computer readable storage medium having program instructions embodied therewith. The program instructions are executable by a system comprising one or more processors to cause the system to perform a method. A non-limiting example of the method includes receiving, by the system, an email message from a sender that is to be transmitted to a plurality of recipients. The email message includes one or more sender selected options, in which the one or more sender selected options includes a response deadline and a requested number of responses, in which the requested number of responses is less than or equal to the number of recipients in the plurality of recipients. The method includes transmitting, by the system, the email message to the plurality of recipients. The method includes receiving, by the system, a number of commitment messages from one or more recipients of the plurality of recipients subsequent to transmitting the email message to the plurality of recipients. Each of the commitment messages is received from a different recipient of the plurality of recipients and includes an indication that the recipient intends to transmit an email response to the sender prior to the response deadline. The method includes transmitting by the system, in response to detecting that the number of received commitment messages is equal to the requested number of responses, a first alert to a subset of recipients of the plurality of recipients, indicating that the subset of recipients do not need to respond to the email message, in which the subset of recipients are the recipients who did not transmit a commitment message to the system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
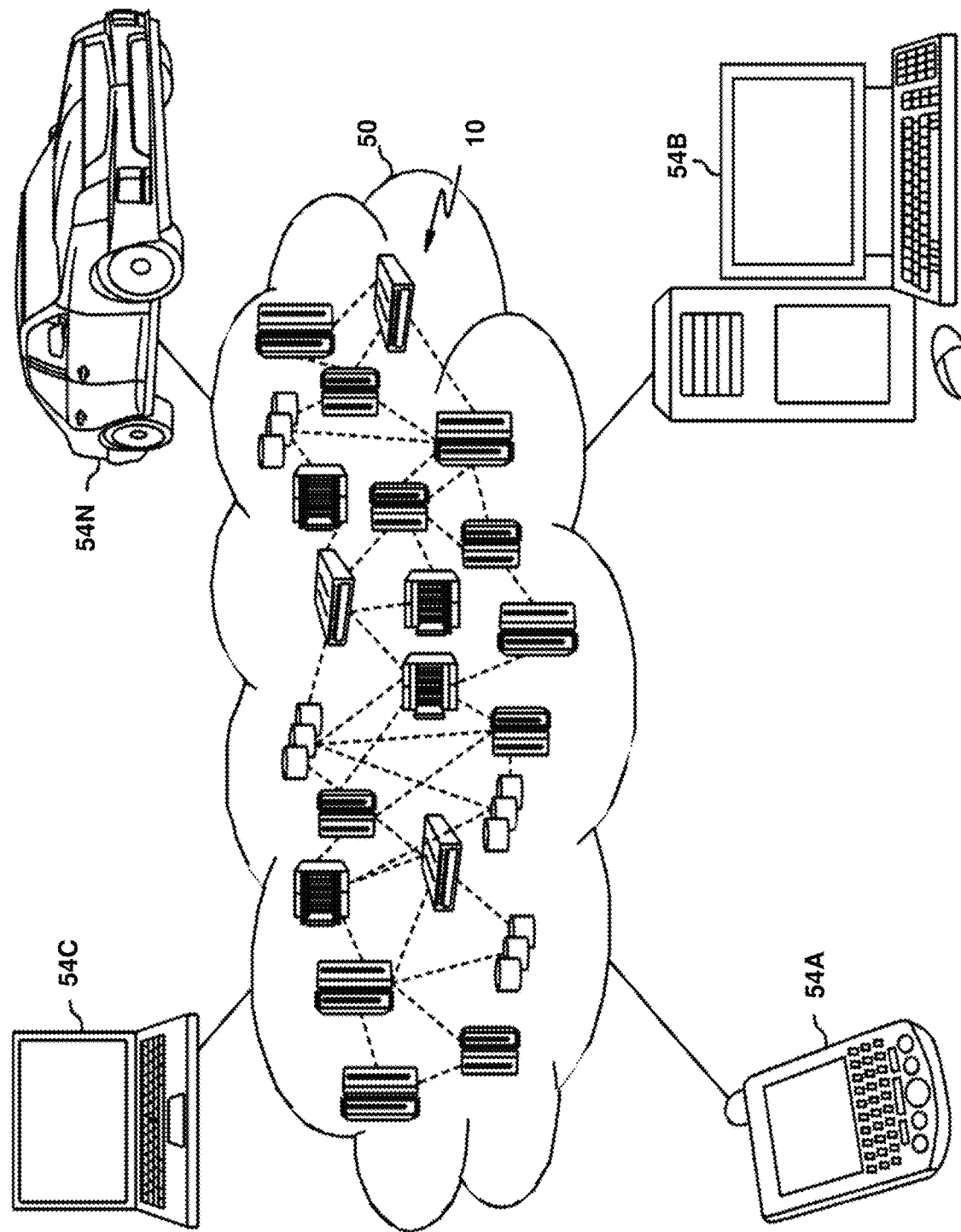
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having" "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
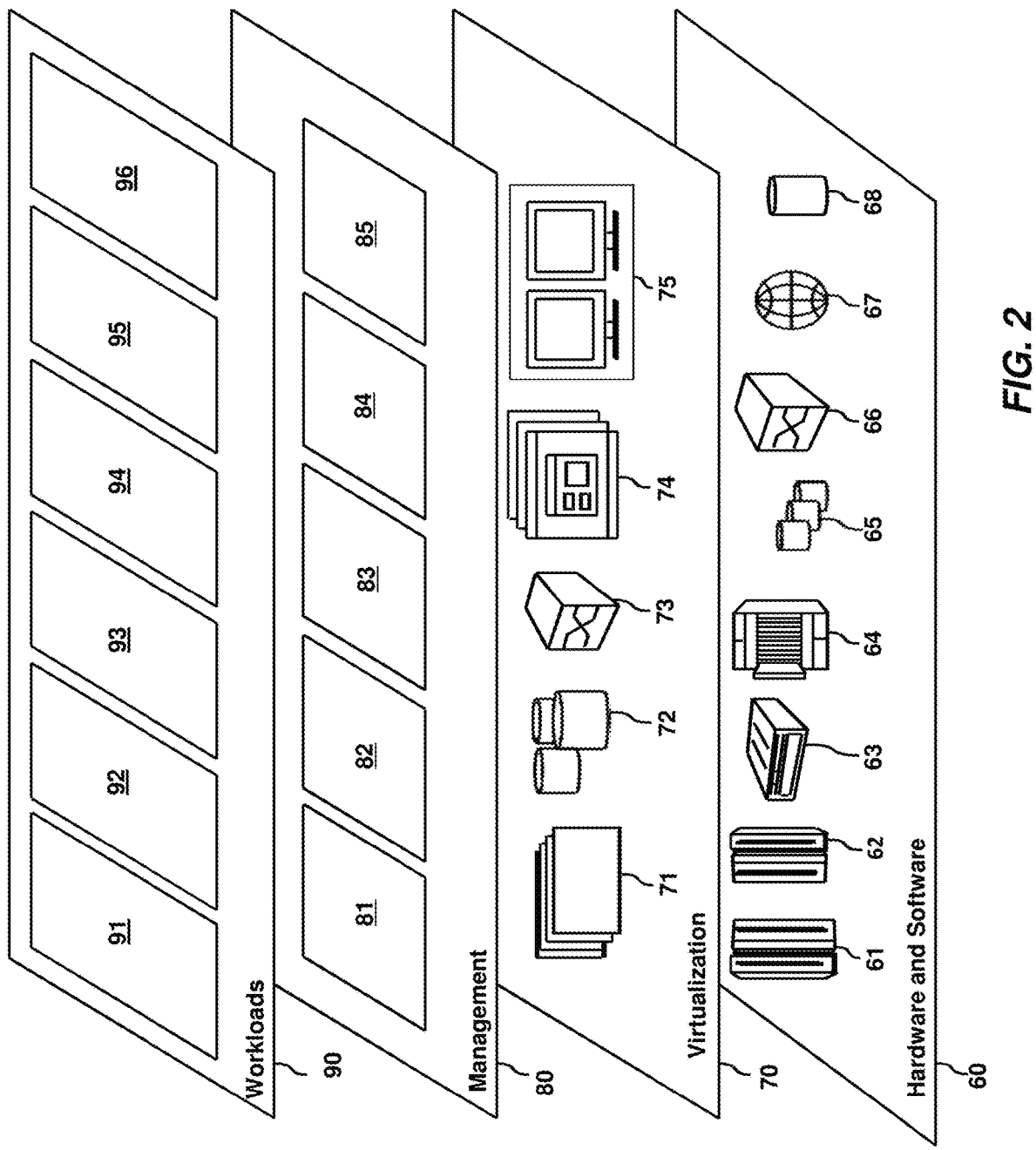
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message exchange processing 96.

Turning now to an overview of technologies that are more specifically relevant to aspects of the invention, as noted above, some email systems allow a sender to send an email to a group of recipients. Often times multiple recipients respond to the email even though only a certain number of responses is desired. In some scenarios, a sender may pose a question to a group of recipients via an email message and each of the recipients may respond to the email message with a similar answer and/or respond at about the same time. However, if a sender only wishes to obtain a single answer to their question, obtaining multiple responses may reduce the efficiency of the email system by expending processing and routing resources for undesired email responses. Additionally, in some scenarios a recipient may have the best information to respond to the sender but become discouraged to provide an answer after a number of recipients respond, which may prevent the correct and/or best feedback from being received by the sender.

Turning now to an overview of the aspects of the invention, one or more embodiments of the invention address the above-described shortcomings of the prior art by providing a message exchange system that is configured to receive an email message from a sender (e.g., a first user) that is to be transmitted to a plurality of recipients (e.g., plurality of second users), in which the email message includes one or more sender selected options. In some embodiments of the present invention, the one or more sender selected options include a response deadline set by the sender and a requested number of responses set by the sender. The message exchange system is configured to transmit the email message to the plurality of recipients and monitor any commitment messages and email responses that are returned from the plurality of recipients. Each commitment message that is received from a recipient includes an indication that the respective recipient intends to respond to the sender's email message prior to the response deadline expiring. The message exchange system is further configured to detect whether and/or when the number of received commitment messages is equal to the requested number of responses. In response to detecting that the number of received commitment messages is equal to the requested number of responses, an alert is transmitted to recipients who did not send a commitment message, in which the alert indicates that those recipients need not respond to the email message at the present time. In some embodiments of the present invention, the message exchange system is further configured to transmit an alert to all recipients or a different subset of recipients in response to detecting that the number of email responses that was received by the message exchange system is less than the requested number of responses.

The above-described aspects of the invention address the shortcomings of the prior art by providing a message exchange system that allows both senders and recipients of emails to establish effective communication in a manner that reduces the computational resources and time spent processing a given email. For example, a sender may compose an email that is transmitted to multiple recipients, in which the sender includes a request to receive one or more responses from any number of the recipients (e.g., requesting that a single response be returned from any recipient; requesting that a response be returned from each recipient, etc.). The email system monitors whether the email is responded to in a timely manner and sends reminders to the recipients who were expected to respond. In some embodiments of the present invention, the sender may subsequently change a sender option of the transmitted email message by changing a current status of the email message such as by, for example, changing the feedback type from a simple response to multiple responses.

Figure 3:
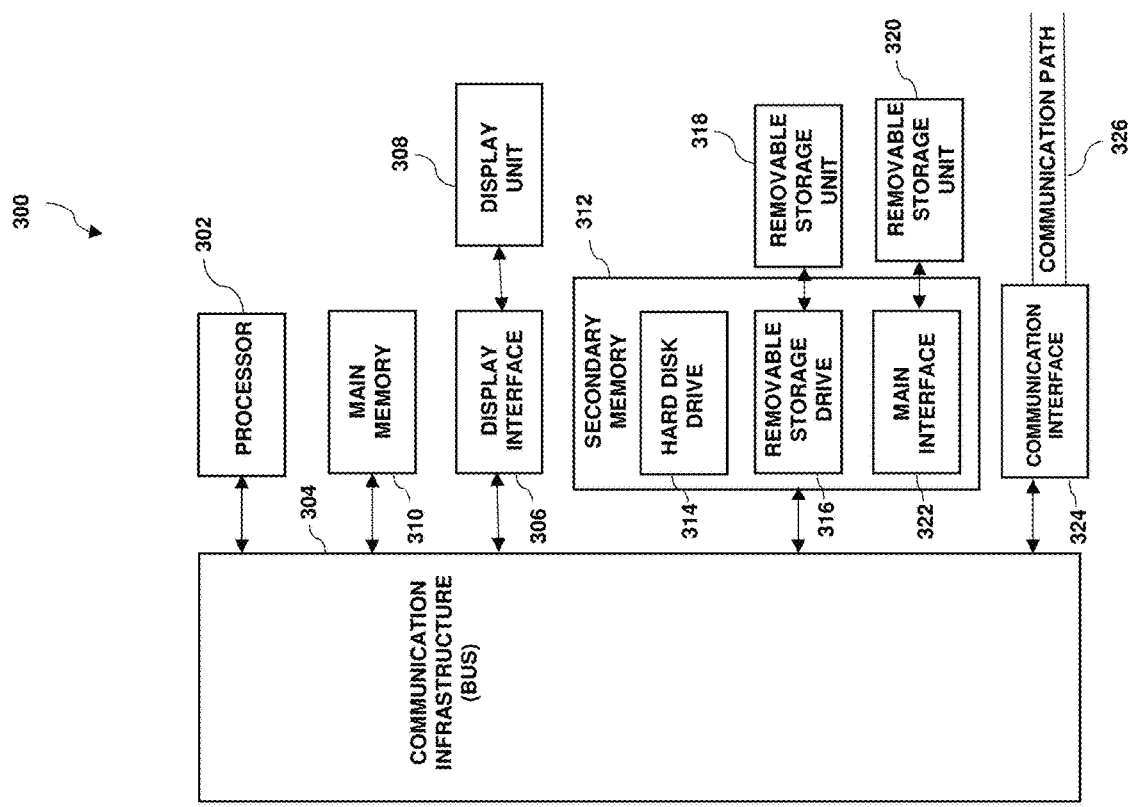
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
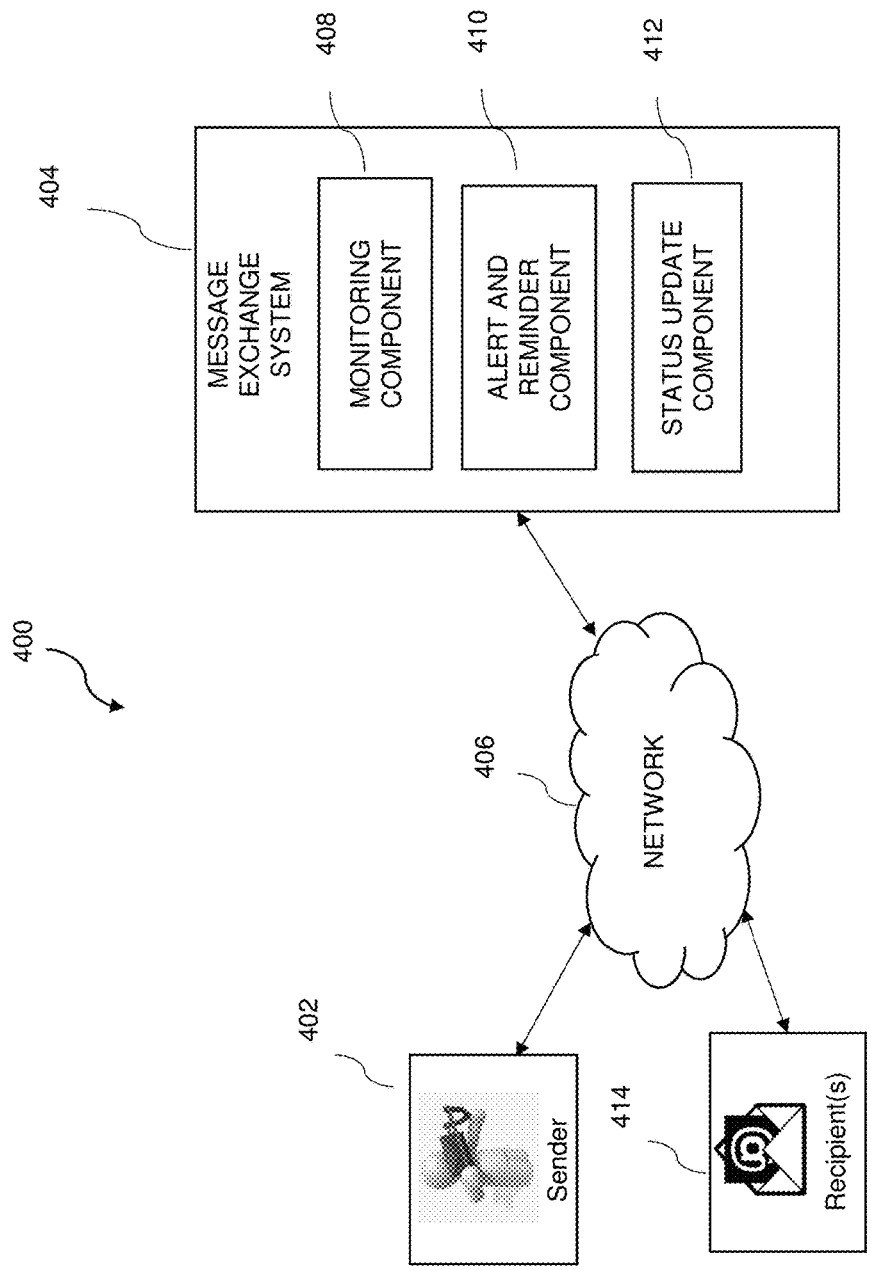
FIG. 4 depicts an example distributed environment in accordance with one or more embodiments of the present invention.

Referring now to FIG. 4, an example distributed environment 400 is presented for optimizing message responses from multiple email recipients. Distributed environment 400 includes sender device 402 associated with a sender, one or more recipient devices 414 that are each associated with a respective recipient, and a message exchange system 404, which are interconnected via network 406. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

Message exchange system 404 includes a monitoring component 408, an alert and reminder component 410, and a status update component 412. In some embodiments of the present invention, monitoring component 408, alert and reminder component 410, and status update component 412 are interconnected via a communication infrastructure 304 and/or a communication path 326. In some embodiments of the present invention, message exchange system 404 is a standalone computing device, a management server, a web server, a mobile computing device, or other suitable electronic device and/or computing system capable of receiving, sending, and processing data. In some embodiments of the present invention, message exchange system 404 is a server computing system utilizing multiple computers, such as in cloud computing environment 50 (FIG. 1). In some embodiments of the present invention, message exchange system 404 is a laptop computer, a tablet computer, a netbook computer, a personal computer (PC), a desktop computer, a personal digital assistant (PDA), a smart phone, or other suitable programmable electronic device capable of communicating with sender device 402 and recipient device(s) 414 and other computing devices (not shown) within distributed environment 400 via network 406. In some embodiments of the present invention, message exchange system 404 is a computing system utilizing clustered computers and components (e.g., database server computers, application server computers, etc.) that act as a single pool of seamless resources that are accessible within distributed environment 400.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between sender device 402, message exchange system 404, recipient device(s) 414, and/or other computing devices (not shown) within a distributed environment 400. In some embodiments of the present invention, distributed environment 400 is implemented as part of a cloud computing environment such as cloud computing environment 50 (FIG. 1).

Figure 6:
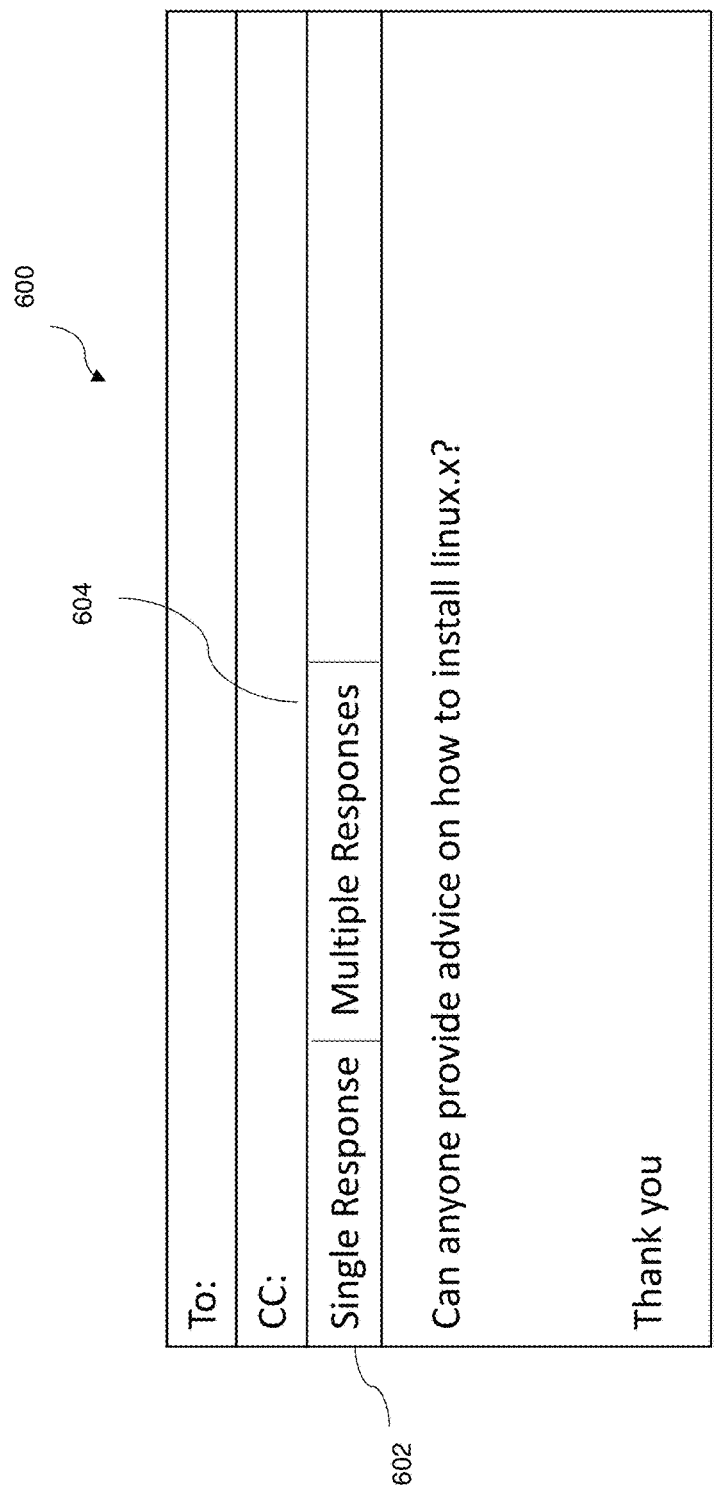
FIG. 6 depicts an example user interface of a sender device in accordance with one or more embodiments of the present invention.

Sender device 402 is configured to send and receive information to and from message exchange system 404 and/or to and from recipient device(s) 414. Sender device 402 is configured to generate a user interface (UI) for composing an email message by the sender (i.e., the user of sender device 402). FIG. 6 illustrates an example UI 600 that may be generated in accordance with one or more embodiments of the present invention. UI 600 allows the sender to enter a list of recipient addresses, provide a message, and select one or more options. As will be discussed in detail below, the one or more options are utilized by message exchange system 404 to handle management of responses from a plurality of recipients. In some embodiments of the present invention, UI 600 includes one or more buttons 602, 604, that allow the sender to designate whether a single response is requested (e.g., a single response from any of the recipients) or whether multiple responses are requested (e.g., multiple responses from different recipients). In some embodiments of the present invention, the one or more options further include a desired response deadline of the sender, which is indicative of when the sender wishes to receive the requested responses. In some embodiments of the present invention, the response deadline is a particular date and/or time (e.g., a particular day, a particular month, a particular year, etc.). In some embodiments of the present invention, the response deadline is a relative date and/or time (e.g., a number of hours since the transmission of the email, a number of days since the transmission of the email, etc.). The sender may designate via UI 600 a particular number of responses that are requested (e.g. one email response, two email responses, three email responses, etc.). In some embodiments of the present invention, message exchange system 404 is configured to disallow responding to the email message after the number of requested responses has been received. In some embodiments of the present invention, the options may be selected by the sender in various ways, such as by entering text into a window of the UI 600 via a keyboard, selecting a button on UI 600 (e.g., buttons 602 or 604) via a mouse, or other suitable manners for providing user input (e.g., voice recognition, touch gestures, etc.). In some embodiments of the present invention, the options are predetermined and set by sender device 402 and/or by message exchange system 404. For example, in some embodiments of the present invention, the response deadline may be a default response deadline that is set by message exchange system 404.

Referring back to FIG. 4, in some embodiments of the present invention, sender device 402 is a laptop computer, a tablet computer, a netbook computer, a personal computer (PC), a desktop computer, a personal digital assistant (PDA), a smart phone, or other suitable programmable electronic device capable of communicating with various components and devices within distributed environment 400. In some embodiments of the present invention, sender device 402 is a programmable electronic mobile device or a combination of programmable electronic mobile devices capable of executing machine readable program instructions and communicating with other computing devices (not shown) within distributed environment 400. In some embodiments of the present invention, sender device 402 may include internal and external hardware components, such as those depicted and described above with respect to FIG. 3.

Figure 7:
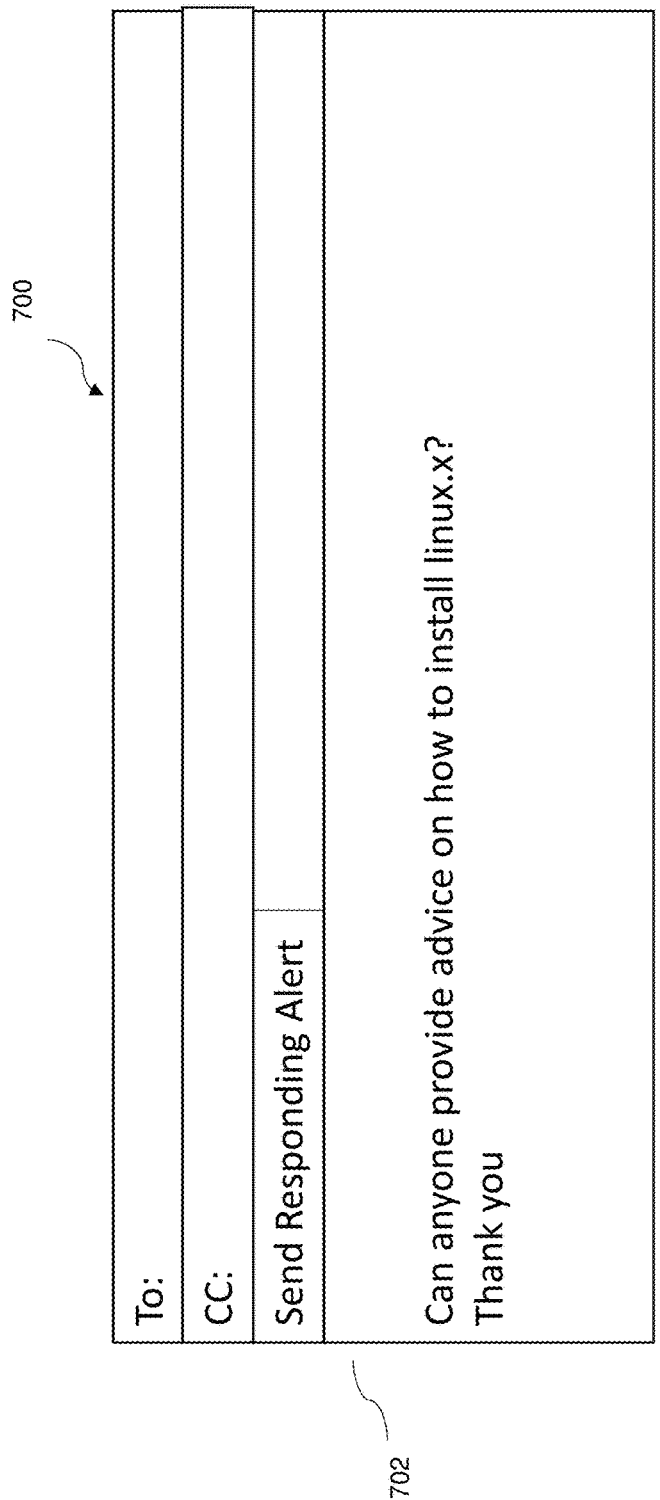
FIG. 7 depicts an example user interface of a recipient device in accordance with one or more embodiments of the present invention.

Each recipient device 414 is configured to send and receive information to and from message exchange system 404 and/or to and from sender device 402. Each recipient device 414 is configured to generate a user interface (UI) for responding to an email message received from the sender. FIG. 7 illustrates an example UI 700 that may be generated in accordance with one or more embodiments of the present invention. Upon receiving the email message from the sender (e.g., via message exchange system 404), UI 700 provides the recipient (i.e., the user of the recipient device) with the option to immediately respond to a received email message or to provide an indication that the recipient intends to respond at a later time. For example, in some embodiments of the present invention, upon receiving an email message from the sender, the recipient may provide a user input, such as clicking button 702 or entering text, which causes recipient device 414 to transmit a commitment message to message exchange system 404. The commitment message indicates that the recipient of the particular recipient device 414 intends to respond to the received email message before the response deadline expires.

Referring back to FIG. 4, in some embodiments of the present invention, each recipient device 414 is a laptop computer, a tablet computer, a netbook computer, a personal computer (PC), a desktop computer, a personal digital assistant (PDA), a smart phone, or other suitable programmable electronic device capable of communicating with various components and devices within distributed environment 400. In some embodiments of the present invention, each recipient device 414 is a programmable electronic mobile device or a combination of programmable electronic mobile devices capable of executing machine readable program instructions and communicating with other computing devices (not shown) within distributed environment 400. In some embodiments of the present invention, each recipient device 414 may include internal and external hardware components, such as those depicted and described above with respect to FIG. 3.

Message exchange system 404 is configured to receive an email message from a sender via a sender device 402 that is associated with the sender and to transmit the email message to a plurality of recipients via a plurality of recipient device(s) 414 that are each associated with a respective recipient. The email message includes one or more sender selected options. As noted above, in some embodiments of the present invention, the one or more selected options include a response deadline and a requested number of responses. In some embodiments of the present invention, the requested number of responses is less than or equal to the number of recipients in the plurality of recipients.

Message exchange system 404 is configured to monitor email responses and commitment messages that are transmitted by the recipients to the sender (e.g., via monitoring component 408). In particular, in some embodiments of the present invention, subsequent to transmitting the email message to the plurality of recipients, message exchange system 404 is configured to receive a number of commitment messages from one or more recipients of the plurality of recipients, in which each of the commitment messages is received from a different recipient of the plurality of recipients and includes an indication that the recipient intends to transmit an email response to the sender before the response deadline expires. In some embodiments of the present invention, the number of commitment messages that are received is greater than one. In some embodiments of the present invention, the number of commitment messages that are received is zero.

Message exchange system 404 is configured to determine whether and/or when the number of received commitment messages is equal to the requested number of responses. In some embodiments of the present invention, the detection is performed prior to the response deadline expiring. In some embodiments of the present invention, the detection is performed after the response deadline expires. In some embodiments of the present invention, in response to detecting that the number of received commitment messages is equal to the requested number of responses, message exchange system 404 is configured to transmit an alert to a subset of recipients of the plurality of recipients. In some embodiments of the present invention, the alert indicates that the subset of recipients do not need to respond to the email message. The alert is presented to the subset of receipts via the recipient device(s) 414 of the subset of recipients. The subset of recipients are the recipients who did not transmit a commitment message to the message exchange system before the response deadline expired. In some embodiments of the present invention, the alert comprises a text-based message. In some embodiments of the present invention, the text-based message of the alert states "no need to respond." In some embodiments of the present invention, the alerts comprises audio, video, and/or image data. In some embodiments of the present invention, the transmitting of the alert comprises transmitting an instruction to the UI of a recipient device 414, in which the instruction instructs the recipient device 414 to display the email message within the UI with a particular color, in which the color is indicative that a response is not needed by the subset of recipients at that time. For example, in some embodiments of the present invention, the color caused to be displayed by the UI is green, in which the color is indicative that no response is presently needed by the recipient. In some embodiments of the present invention, in response to receiving a commitment message from a recipient of the plurality of recipients, message exchange system 404 transmits an alert to the recipient who sent the commitment message, in which the alert instructs the recipient device 414 of the recipient to display a particular color, in which the color is indicative that a response from the recipient is expected by the system. For example, in some embodiments of the present invention, after receiving a commitment message from a recipient device 414, the color yellow may be caused to be displayed by the UI of the recipient device 414, in which the color yellow is indicative that a response from the recipient is expected by message exchange system 404. In some embodiments of the present invention, after receiving a commitment message from a recipient device 414, the color red may be caused to be displayed by the UI of the recipient device 414, in which the color red is indicative that an urgent response is needed from the recipient.

In some embodiments of the present invention, message exchange system 404 is further configured to receive a number of email responses from the plurality of recipients in response to the email message to detect whether the number of received email responses is equal to the number of requested responses. In some embodiments of the present invention, the detection is performed prior to the response deadline expiring. In some embodiments of the present invention, the detection is performed after the response deadline expires. In some embodiments of the present invention, in response to detecting after the response deadline that the number of received email responses is less than the requested number of responses, message exchange system 404 is configured to transmit a second alert to the plurality of recipients indicating that the requested number of email responses was not received.

In some embodiments of the present invention, message exchange system 404 is configured to transmit any received email responses to the sender device 402 after the response deadline expires. In some embodiments of the present invention, message exchange system 404 is configured to transmit the email responses to the sender device 402 as they are received (i.e., before and/or after the response deadline expires).

In some embodiments of the present invention, in response to detecting that the number of received email responses is equal to the requested number of responses, message exchange system 404 is configured to disallow any further transmission of email responses by the plurality of recipients (e.g., blocks messages sent from the recipient devices 414, blocks composing of messages by the UI of the recipient devices 414, etc.). In some embodiments of the present invention, in response to detecting that the number of received email responses is equal to the requested number of responses, message exchange system 404 is configured to disallow transmission of email responses by the subset of recipients only as opposed to disallowing transmission of email responses from all of the plurality of recipients.

In some embodiments of the present invention, message exchange system 404 is configured to periodically transmit reminders to recipients who have indicated that they would be responding to the email message (i.e., via alert and reminder component 410). For example, in some embodiments of the present invention, message exchange system 404 is configured to transmit a reminder to at least one recipient of the one or more recipients, who provided a commitment message to the message exchange system, in which the reminder is transmitted prior to the response deadline expiring. In some embodiments of the present invention, the reminder is transmitted at a predetermined time prior to the requested response deadline (e.g., one hour before the response deadline, one day before the response deadline, one week before the response deadline, etc.).

In some embodiments of the present invention, message exchange system 404 is configured to receive a status update transmission from a sender, in which the status update transmission includes a request that the number of requested responses be changed. For example, in some embodiments of the present invention, if an original email message indicated that the requested number of responses was one, the sender may decide to transmit a status update request to request that message exchange system 404 change the requested number of responses to a value that is greater than one (e.g., two responses, three responses, etc.). Message exchange system 404 may then change the requested number of responses to the new value in response to receiving the status update transmission (e.g., changing from one requested response to two or more required responses). Similarly, if an original email message indicated that the number of requested responses was two or more, the sender may decide to transmit a status update to request that requests that message exchange system 404 change the requested number of responses to one. Message exchange system 404 may then change the requested number of responses to one in view of the received status update transmission (e.g., changing from two or more requested responses to one requested response).

Figure 5A:
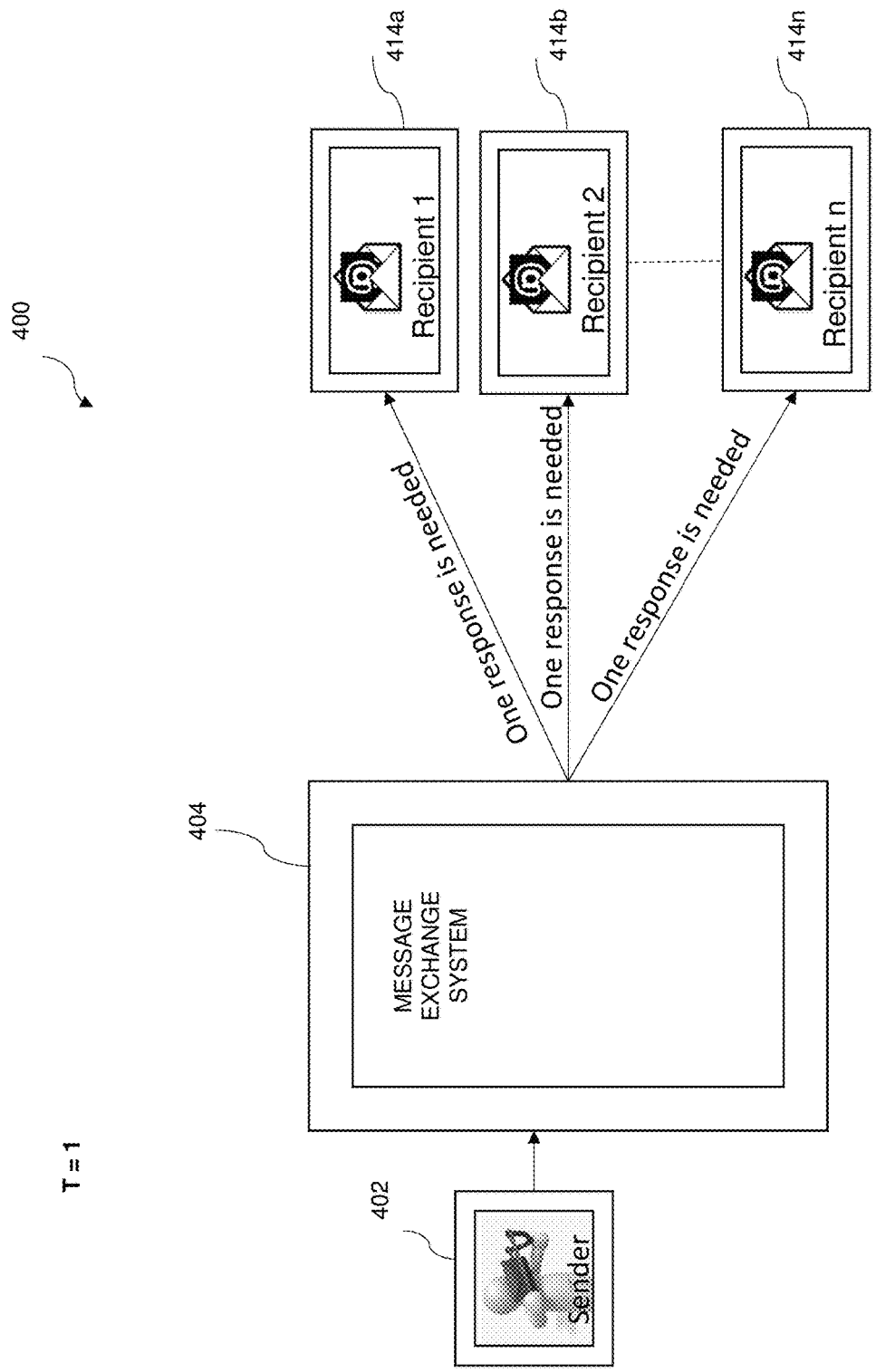
FIGS. 5A-5E depicts an example implementation of the distributed environment of FIG. 4 at different points in time in accordance with one or more embodiments of the present invention.
Figure 5B:
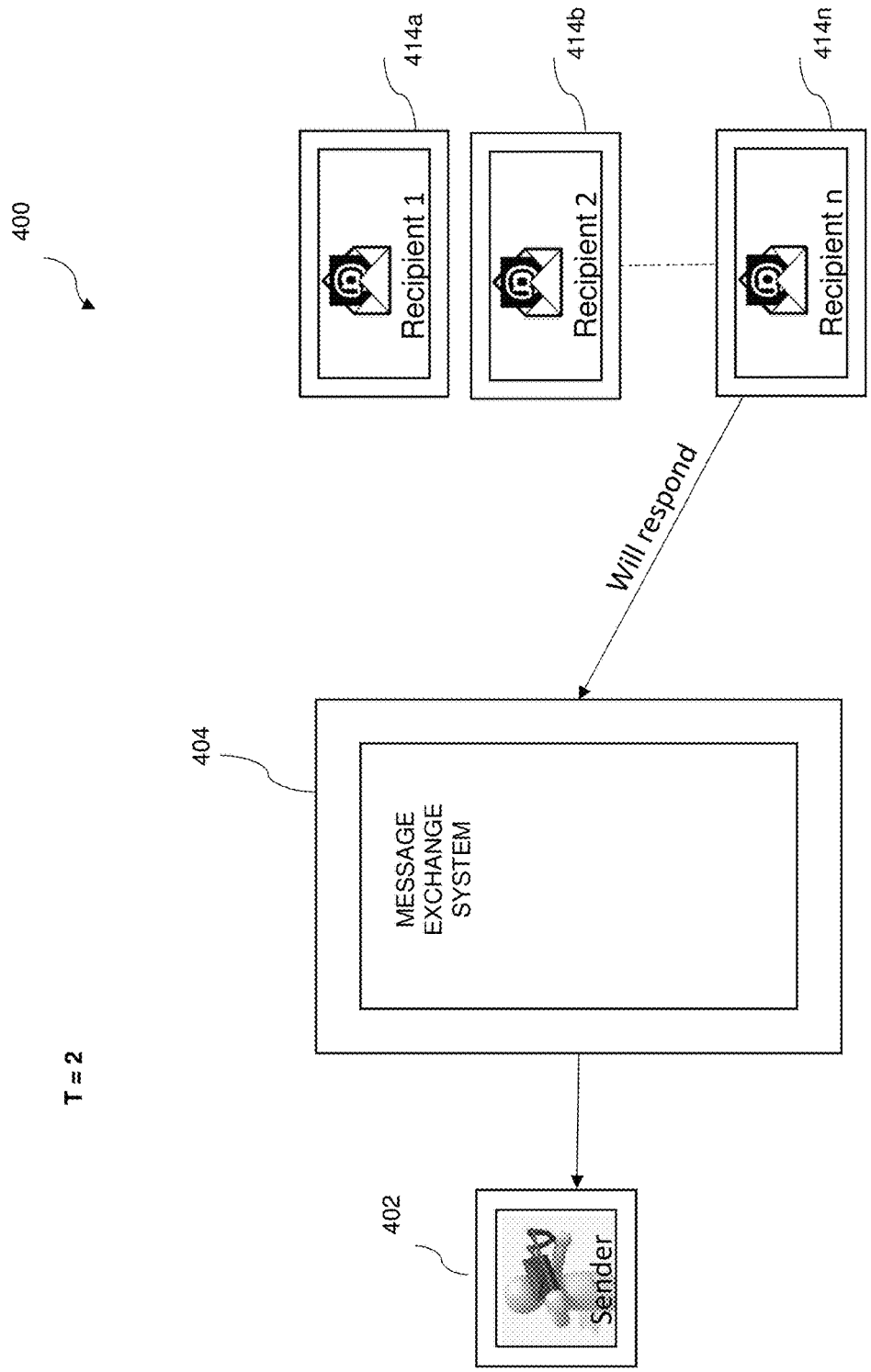
Figure 5C:
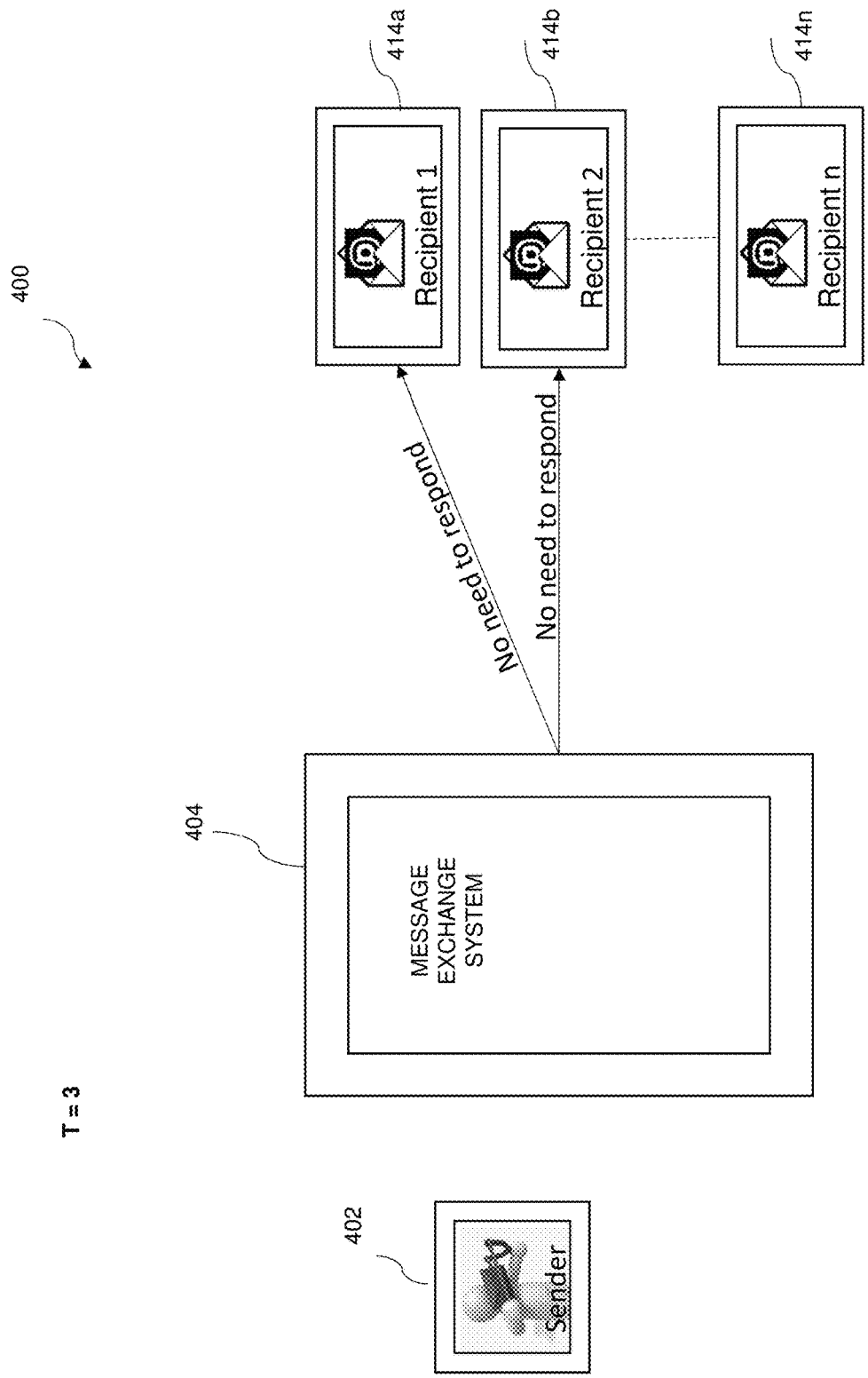
Figure 5D:
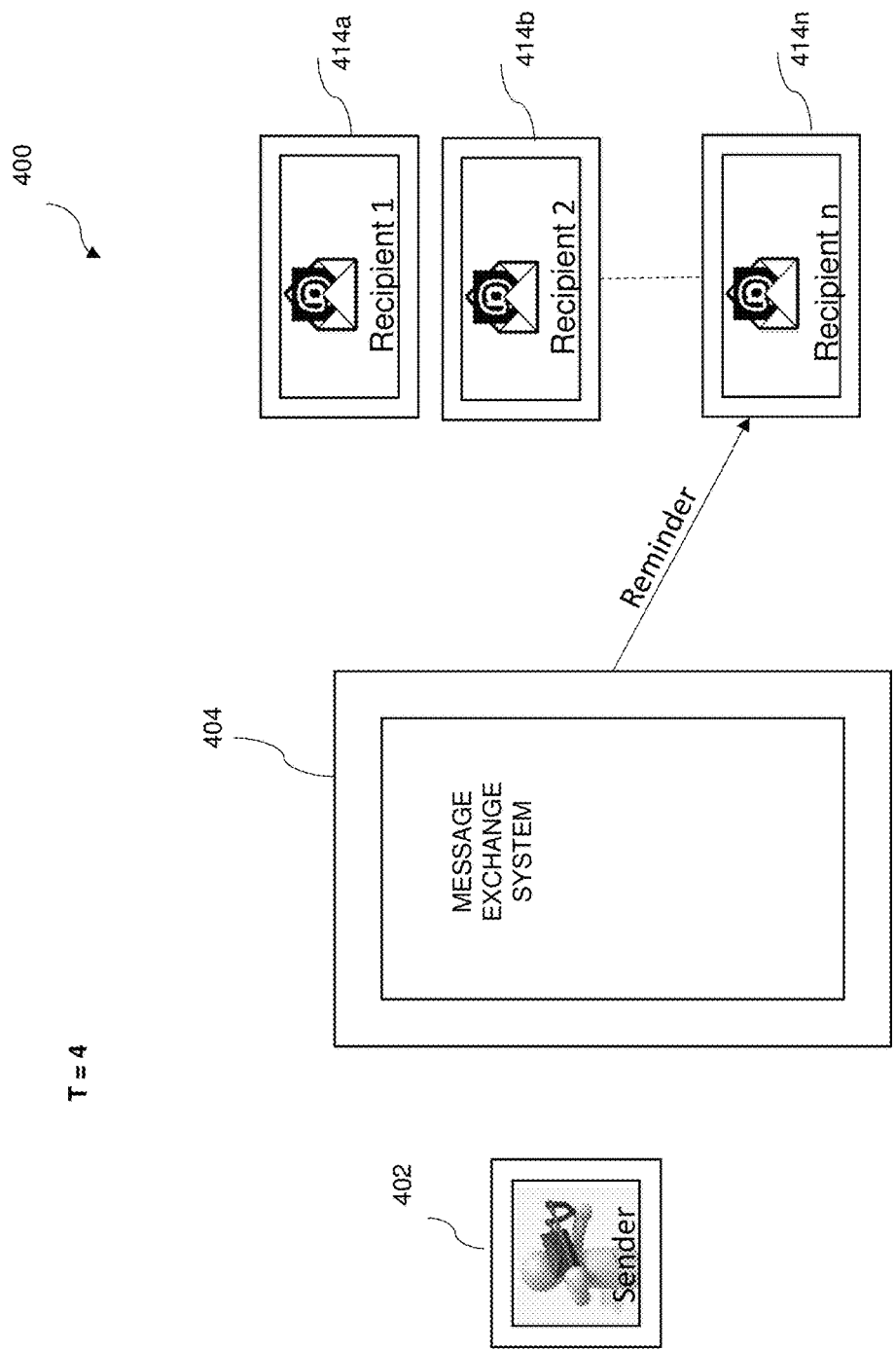
Figure 5E:
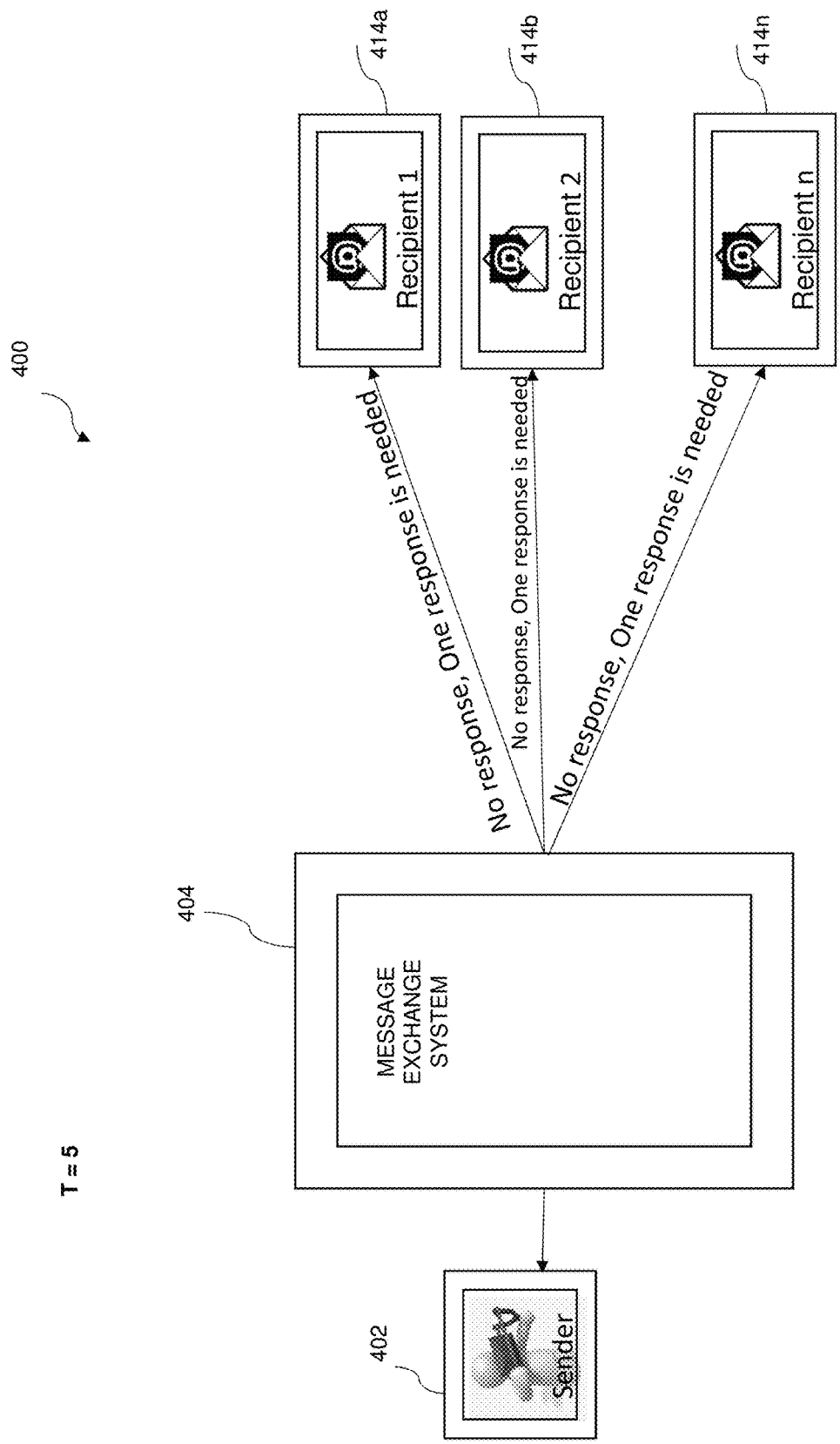

FIGS. 5A-5E illustrate an example implementation of a distributed environment 400 at different points in time in accordance with one or more embodiments of the present invention. In particular, FIG. 5A illustrates distributed environment 400 at a first point in time (T=1), FIG. 5B illustrates distributed environment 400 at a second point in time (T=2), FIG. 5C illustrates distributed environment 400 at a third point in time (T=3), FIG. 5D illustrates distributed environment 400 at a fourth point in time (T=4), and FIG. 5E illustrate distributed environment 400 at a fifth point in time (T=5). At the first point in time (T=1), sender 402 sends an email to message exchange system 404 that is intended to be transmitted to a plurality of recipients 414a, 414b, 414n, in which the email includes a message, a request for a single response, and a response deadline. Message exchange system 404 transmits the email message to the plurality of recipients 414a, 414b, 414n with an indication that only one response is needed. At the second point in time (T=2), recipient 414n transmits a commitment message to message exchange system 404 indicating that recipient 414n intends to respond to the email message sent from the sender 402 before the response deadline expires. At the third point in time (T=3), message exchange system 404 transmits an alert to recipient 414a and recipient 414b indicating that they do not need to respond as recipient 414n already indicated that they intend to response to the email (i.e., recipient 414a transmitted a commitment message at the second point in time (T=2)). At the fourth point in time (T=4), message exchange system 404 transmits a reminder to recipient 414n to remind recipient 414n to provide an email response before the response deadline. At the fifth point in time (T=5), as recipient 414n failed to provide an email response within the response deadline, message exchange system 404 transmits an alert to all the recipients (e.g., recipients 414a, 414b, 414n) indicating that one response is still needed. Sender 402 is then provided with an update regarding the status of the requested response.

In some embodiments of the present invention, if a recipient who committed to send a response fails to send a response before the response deadline expires and/or fails to send a response before a second predetermined amount of time expires (e.g. N number of minutes, hours, days, etc. before the deadline expires), message exchange system 404 then transmits a request to another recipient requesting that the other recipient respond to email message. In some embodiments of the present invention, a priority list is established by the messages exchange system 404 such that the message is first sent to only some preferred recipients. For example, the message is sent to the first preferred recipient; if a first preferred recipient fails to respond within a certain period of time, the message is sent to the second preferred recipient; and so on. In some embodiments of the present invention, if the $n^{th}$ preferred recipient fails to response, then instead of (or in addition to) sending a request to the next recipient in the list, message exchange system 404 transmits a request to all the recipients indicating that one response is still needed.

Figure 8:
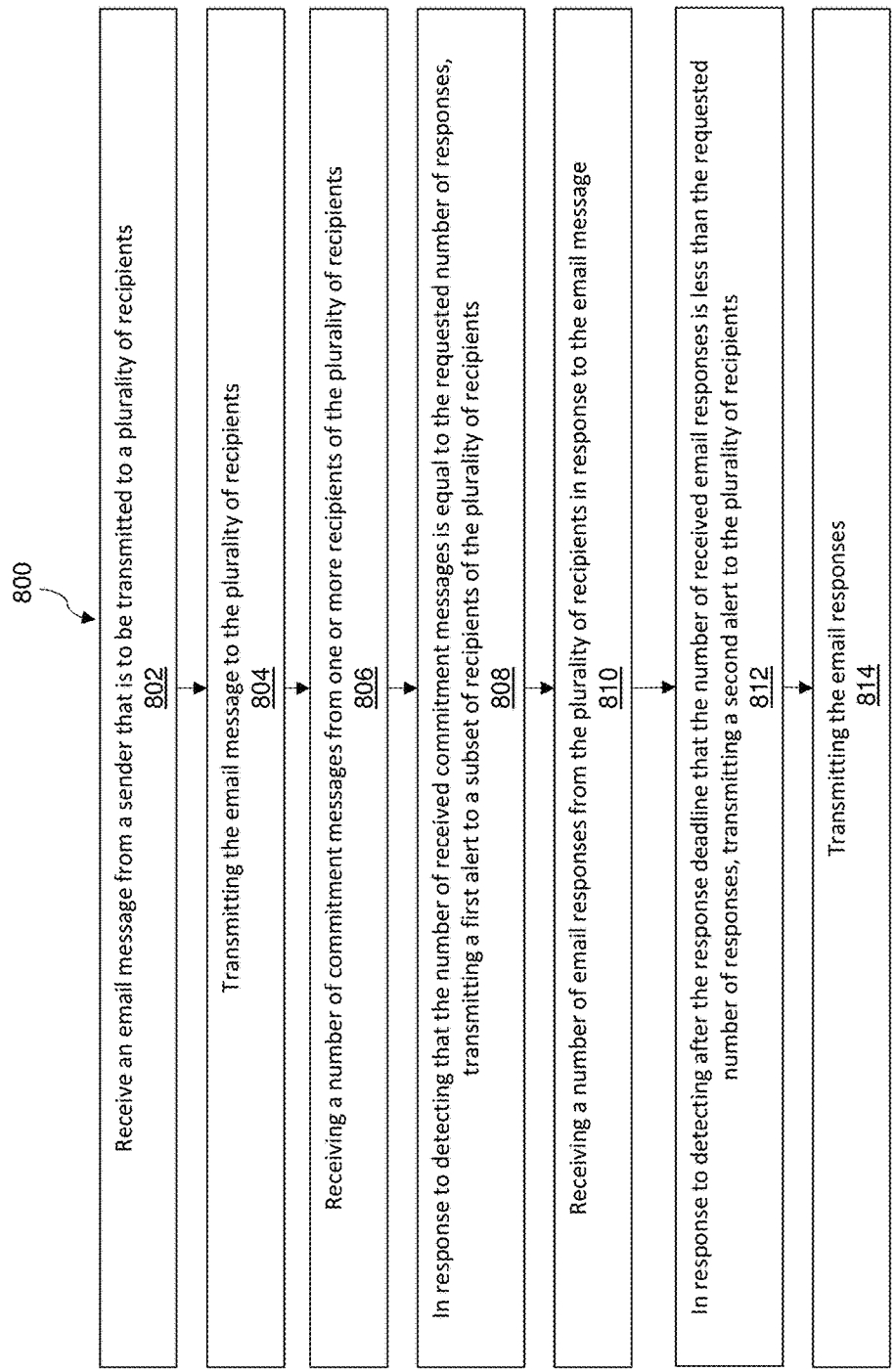
FIG. 8 depicts a flow diagram illustrating a methodology in accordance with one or more embodiments of the present invention.

Additional details of the operation of message exchange system 404 will now be described with reference to FIG. 8, wherein FIG. 8 depicts a flow diagram illustrating a methodology 800 according to one or more embodiments of the present invention. At 802, an email message is received from a sender (e.g., via message exchange system 404), in which the email message is to be transmitted to a plurality of recipients. The email message includes one or more sender selected options, in which the one or more sender selected options includes a response deadline and a requested number of responses, in which the requested number of responses is less than or equal to the number of recipients in the plurality of recipients. At 804, the email message is transmitted to the plurality of recipients (e.g., via message exchange system 404). At 806, a number of commitment messages are received from one or more recipients of the plurality of recipients (e.g., via monitoring component 408). Each of the commitment messages is received from a different recipient of the plurality of recipients and includes an indication that the recipient intends to transmit an email response to the sender prior to the response deadline expiring. The number of commitment messages received may be zero or greater than zero At 808, a first alert is transmitted to a subset of recipients of the plurality of recipients (e.g., via message alert and reminder component 410), in which the first alert is transmitted in response to detecting that the number of received commitment messages is equal to the requested number of responses. The first alert indicates that the subset of recipients do not need to respond to the email message. The subset of recipients are the recipients of the plurality of recipients, who did not transmit a commitment message to the message exchange system. The detection is performed either before or after the response deadline expires. At 810, a number of emails responses are received from the plurality of recipients (e.g., via monitoring component 408). The number of email responses received may be zero or greater than zero. At 812, a second alert is transmitted to the plurality of recipients (e.g., via message alert and reminder component 410), in which the second alert is transmitted in response to detecting that the number of received email responses is less than the requested number of responses, in which the detection is performed after the response deadline expires. The second alert indicates that the requested number of email responses was not received. At 814, the email responses are transmitted to the sender (e.g., via message exchange system 404).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for optimized processing of message responses from multiple email recipients, the method comprising:
    receiving, by a message exchange system comprising one or more processors, an email message from a sender that is to be transmitted to a plurality of recipients, wherein the email message includes one or more sender selected options, wherein the one or more sender selected options includes a response deadline and a requested number of responses, wherein the requested number of responses is less than or equal to a number of recipients in the plurality of recipients;
    transmitting, by the message exchange system, the email message to the plurality of recipients;
    subsequent to transmitting the email message to the plurality of recipients, receiving, by the message exchange system, a number of commitment messages from one or more recipients of the plurality of recipients, wherein each of the commitment messages is received from a different recipient of the plurality of recipients and includes an indication that the recipient intends to transmit an email response to the sender prior to the response deadline; and
    in response to detecting that the number of received commitment messages is equal to the requested number of responses, transmitting, by the message exchange system, a first alert to a subset of recipients of the plurality of recipients indicating that the subset of recipients do not need to respond to the email message, wherein the subset of recipients comprises recipients of the plurality of recipients who did not transmit a commitment message to the message exchange system.

2. The computer-implemented method of claim 1 further comprising:
    receiving, by the message exchange system, a number of email responses from the plurality of recipients in response to the email message; and
    detecting, by the message exchange system, after the response deadline, whether the number of received email responses is equal to the requested number of responses; and
    in response to detecting, by the message exchange system, after the response deadline, that the number of received email responses is less than the requested number of responses, transmitting a second alert to the plurality of recipients indicating that the requested number of responses was not received; and
    transmitting, by the message exchange system, the email responses to the sender.

3. The computer-implemented method of claim 2 further comprising:
    in response to detecting, by the message exchange system, that the number of received responses is equal to the requested number of responses, disallowing further transmissions of email responses by the plurality of recipients.

4. The computer-implemented method of claim 2 further comprising:
    in response to detecting, by the message exchange system, that the number of received commitment messages is equal to the requested number of responses, disallowing transmission of email responses by the subset of recipients.

5. The computer-implemented method of claim 1 further comprising:
    transmitting, by the message exchange system, a reminder to at least one recipient of the one or more recipients who provided a commitment message to the message exchange system, wherein the reminder is transmitted prior to the response deadline.

6. The computer-implemented method of claim 1, wherein the number of requested responses set by the sender is two or more, wherein the method further comprises:
    receiving, by the message exchange system, a status update transmission from the sender requesting that the requested number of responses be changed to one; and
    in response to receiving the status update transmission, changing the requested number of responses to one.

7. The computer-implemented method of claim 1, wherein the number of requested responses set by the sender is one, wherein the method further comprises:
    receiving, by the message exchange system, a status update transmission from the sender requesting that the requested number of responses be changed to two or more; and
    in response to receiving the status update transmission, changing the requested number of responses to two or more.

8. A computer program product for optimized processing of message responses from multiple email recipients, the computer program product comprising a computer readable storage medium having program instructions embodied therewith, the program instructions executable by a system comprising one or more processors to cause the system to perform a method, the method comprising:

receiving, by the system, an email message from a sender that is to be transmitted to a plurality of recipients, wherein the email message includes one or more sender selected options, wherein the one or more sender selected options includes a response deadline and a requested number of responses, wherein the requested number of responses is less than or equal to a number of recipients in the plurality of recipients;

transmitting, by the system, the email message to the plurality of recipients;

subsequent to transmitting the email message to the plurality of recipients, receiving, by the system, a number of commitment messages from one or more recipients of the plurality of recipients, wherein each of the commitment messages is received from a different recipient of the plurality of recipients and includes an indication that the recipient intends to transmit an email response to the sender prior to the response deadline; and in response to detecting that the number of received commitment messages is equal to the requested number of responses, transmitting, by the system, a first alert to a subset of recipients of the plurality of recipients indicating that the subset of recipients do not need to respond to the email message, wherein the subset of recipients comprises recipients of the plurality of recipients who did not transmit a commitment message to the system.

9. The computer program product of claim 8, wherein the method further comprises:

receiving, by the system, a number of email responses from the plurality of recipients in response to the email message; and detecting, by the system, after the response deadline, whether the number of received email responses is equal to the requested number of responses; and in response to detecting, by the system, after the response deadline, that the number of received email responses is less than the requested number of responses, transmitting a second alert to the plurality of recipients indicating that the requested number of email responses was not received; and transmitting, by the system, the email responses to the sender.

10. The computer program product of claim 9, wherein the method further comprises:

in response to detecting, by the system, that the number of received email responses is equal to the requested number of responses, disallowing further transmissions of email responses by the plurality of recipients.

11. The computer program product of claim 9, wherein the method further comprises:

in response to detecting, by the system, that the number of received commitment messages is equal to the requested number of responses, disallowing transmission of email responses by the subset of recipients.

12. The computer program product of claim 8, wherein the method further comprises transmitting, by the system, a reminder to at least one recipient of the one or more recipients who provided a commitment message to the system, wherein the reminder is transmitted prior to the response deadline.

13. The computer program product of claim 8, wherein the number of requested responses set by the sender is two or more, wherein the method further comprises:

receiving, by the system, a status update transmission from the sender requesting that the requested number of responses be changed to one; and in response to receiving the status update transmission, changing the requested number of responses to one.

14. The computer program product of claim 8, wherein the number of requested responses set by the sender is one, wherein the method further comprises:

receiving, by the system, a status update transmission from the sender requesting that the requested number of responses be changed to two or more; and in response to receiving the status update transmission, changing the requested number of responses to two or more.

15. A system for optimized handling of message responses from multiple email recipients, the system comprising one or more processors configured to perform a method, the method comprising:

receiving, by the system, an email message from a sender that is to be transmitted to a plurality of recipients, wherein the email message includes one or more sender selected options, wherein the one or more sender selected options includes a response deadline and a requested number of responses, wherein the requested number of responses is less than or equal to a number of recipients in the plurality of recipients;

transmitting, by the system, the email message to the plurality of recipients;

subsequent to transmitting the email message to the plurality of recipients, receiving, by the system, a number of commitment messages from one or more recipients of the plurality of recipients, wherein each of the commitment messages is received from a different recipient of the plurality of recipients and includes an indication that the recipient intends to transmit an email response to the sender prior to the response deadline; and in response to detecting that the number of received commitment messages is equal to the requested number of responses, transmitting, by the system, a first alert to a subset of recipients of the plurality of recipients indicating that the subset of recipients do not need to respond to the email message, wherein the subset of recipients comprises recipients of the plurality of recipients who did not transmit a commitment message to the system.

16. The system of claim 15, wherein the method further comprises:

receiving, by the system, a number of email responses from the plurality of recipients in response to the email message; and detecting, by the system, after the response deadline, whether the number of received email responses is equal to the requested number of responses; and in response to detecting, by the system, after the response deadline, that the number of received email responses is less than the requested number of responses, transmitting a second alert to the plurality of recipients indicating that the requested number of email responses was not received; and transmitting, by the system, the email responses to the sender.

17. The system of claim 16, wherein the method further comprises:

in response to detecting, by the system, that the number of received email responses is equal to the requested number of responses, disallowing further transmissions of email responses by the plurality of recipients.

18. The system of claim 16, wherein the method further comprises:
in response to detecting, by the system, that the number of received commitment messages is equal to the requested number of responses, disallowing transmission of email responses by the subset of recipients.

19. The system of claim 15, wherein the method further comprises:
transmitting, by the system, a reminder to at least one recipient of the one or more recipients who provided a commitment message to the system, wherein the reminder is transmitted prior to the response deadline.

20. The system of claim 15, wherein the number of requested responses set by the sender is two or more, wherein the method further comprises:
receiving, by the system, a status update transmission from the sender requesting that the requested number of responses be changed to one; and
in response to receiving the status update transmission, changing the requested number of responses to one.

* * * * *